UNITED STATES PATENT OFFICE.

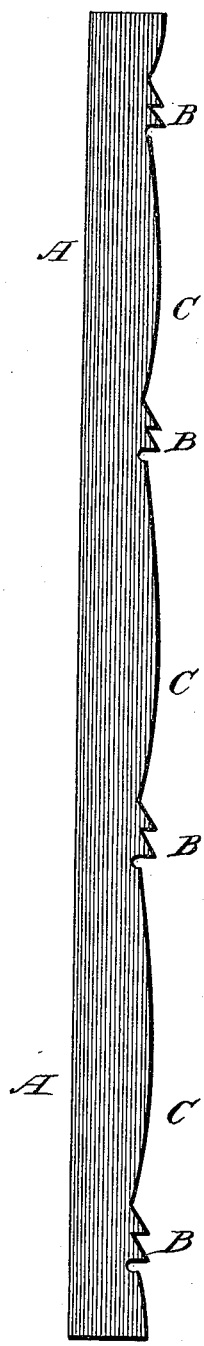

CALVIN ALBERTSON, OF DALTON, INDIANA.

IMPROVEMENT IN SAWS.

Specification forming part of Letters Patent No. 179,390, dated July 4, 1876; application filed January 11, 1876.

*To all whom it may concern:*

Be it known that I, CALVIN ALBERTSON, of Dalton, in the county of Wayne and State of Indiana, have invented certain new and useful Improvements in Saws; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates, particularly, to band-saws used in machines for sawing barrel-staves; and it consists in cutting the teeth of such saws in sets of two each, the sets being from two to eight inches apart, and the blade between the sets of teeth formed convex or rounding, as will be hereinafter more fully set forth.

In the annexed drawing, A represents the blade of a band-saw, and B B are the teeth cut in the edge thereof. These teeth are cut in sets of two each, and the sets are from two to eight inches apart. The portions C C of the saw-blade between the sets of teeth are made convex or rounding on their outer edges, the highest points of said convex portions C being on a line, or nearly on a line, with the points of the teeth.

This band-saw is particularly intended for sawing staves or other like articles where the sawing is done lengthwise with the grain of the wood. The rounding parts C act as guides, so that the saw will not catch or take too much hold of the timber. It will not choke up as in ordinary saws.

Having thus fully described my invention, what I claim as new, and desire to secure by Letters Patent, is—

A band-saw having its teeth cut in sets of two each, said sets being from two to eight inches apart, and the portions of the blade between the sets of teeth made convex or rounding, all substantially as shown and described, and for the purposes herein set forth.

In testimony that I claim the foregoing as my own I affix my signature in presence of two witnesses.

CALVIN ALBERTSON.

Witnesses:
JOHN BALDWIN,
MARVIN CHANNESS.